(12) United States Patent
Wright

(10) Patent No.: US 6,698,315 B1
(45) Date of Patent: *Mar. 2, 2004

(54) HIGH TORQUE WRENCHING SYSTEM

(75) Inventor: Richard B. Wright, Akron, OH (US)

(73) Assignee: Wright Tool Company, Barberton, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 471 days.

(21) Appl. No.: 09/059,712

(22) Filed: Apr. 13, 1998

(51) Int. Cl.⁷ .............................................. B25B 13/06
(52) U.S. Cl. ........................................ 81/121.1; 81/436
(58) Field of Search ............................... 81/121.1, 436, 81/441, 119, 124.2, 124.3, 460, 461; 411/402–405, 410

(56) References Cited

U.S. PATENT DOCUMENTS

| | | |
|---|---|---|
| 996,841 A | 7/1911 | Dixon |
| 2,400,205 A | 5/1946 | Livermont |
| 2,685,812 A | 8/1954 | Dmitroff |
| 2,813,450 A | 11/1957 | Dzus |
| 3,354,757 A | 11/1967 | Grimm et al. |
| 3,425,214 A | 2/1969 | Ohlson |
| 3,802,303 A | 4/1974 | Evans et al. ............ 81/185 |
| 3,834,269 A | 9/1974 | Ohringer |
| 3,854,372 A | 12/1974 | Gutshall |
| 3,881,377 A | 5/1975 | Evans et al. ............ 81/186 |
| 3,903,764 A | 9/1975 | Andersen |
| 3,908,488 A | 9/1975 | Andersen |
| 4,073,160 A | 2/1978 | Perret |
| 4,084,478 A | 4/1978 | Simmons |

(List continued on next page.)

FOREIGN PATENT DOCUMENTS

| | | |
|---|---|---|
| DE | 306 294 | 6/1918 |
| DE | 40 22 763 A1 | 1/1991 |
| DE | 19610748 | 1/1997 |
| FR | 2 234 095 | 1/1975 |
| GB | 1204294 | 9/1970 |
| GB | 2060452 | 5/1981 |
| GB | 2140523 | 11/1984 |
| WO | WO8809708 | 12/1988 |
| WO | WO 99/18361 | 4/1999 |
| WO | WO 00/13587 | 3/2000 |

OTHER PUBLICATIONS

PCT Written Opinion for PCT/US99/08019 claiming priority of U.S. patent application No. 09/059,712.pp. 1–6.
Phillips Screw Company, *Specification sheets*, 16 pp., 1992.
John Forbis, "Double–stage fracturable fastener for bondable elements" Navy Technical Disclosure Bulletin, vol. 10, No. 3, Mar. 1985 pp. 45–51.
"Screws have automatic torque control" Machine Design, vol. 54, No. 23, Oct. 1982, p. 112.

*Primary Examiner*—D. S. Meislin
(74) *Attorney, Agent, or Firm*—D. Peter Hochberg; Sean Mellino; Katherine R. Vieyra

(57) ABSTRACT

A high torque wrenching system is provided having a wrench with asymmetrical torque transmission capability. The wrench includes a plurality of protuberances and a plurality of recesses around a central axis. The fastener also includes a plurality of protuberances and recesses around the central axis for mating with the wrench. The protuberances and recesses form a saw tooth shape. Each tooth or protuberance is formed by a first wrenching surface for loosening the fastener and a second wrenching surface for tightening the fastener. The wrenching surface carrying the loosening load will be at a much smaller angle, with respect to a radial vector extending from the wrench's central axis, than the wrenching surface carrying the tightening load. The result is that the loosening torque vector will have a much greater moment arm.

21 Claims, 6 Drawing Sheets

U.S. PATENT DOCUMENTS

| | | |
|---|---|---|
| 4,151,621 A | 5/1979 | Simmons |
| 4,187,892 A | 2/1980 | Simmons |
| 4,352,614 A | 10/1982 | Hirsch |
| 4,742,735 A | 5/1988 | Stencel |
| 4,882,957 A | 11/1989 | Wright et al. |
| 5,012,706 A | 5/1991 | Wright et al. |
| 5,174,704 A | 12/1992 | Kazino et al. |
| 5,481,948 A | 1/1996 | Zerkovitz |
| D372,409 S | 8/1996 | Wright et al. .................. D8/25 |
| 5,542,273 A | 8/1996 | Bednarz |
| 5,551,322 A | 9/1996 | Mikic et al. |
| 5,921,735 A | 7/1999 | Hughes |
| 5,957,645 A | 9/1999 | Stacy |

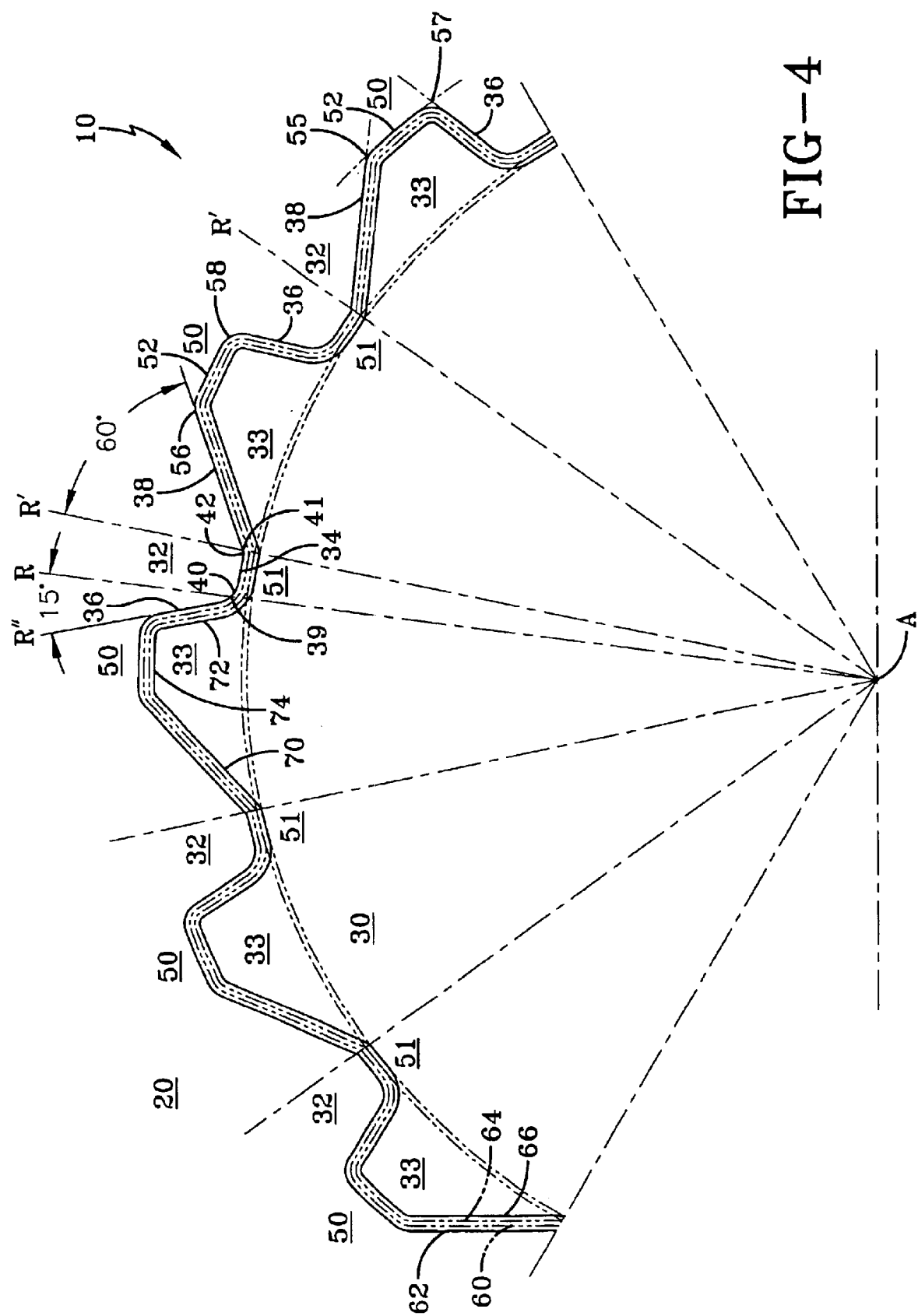

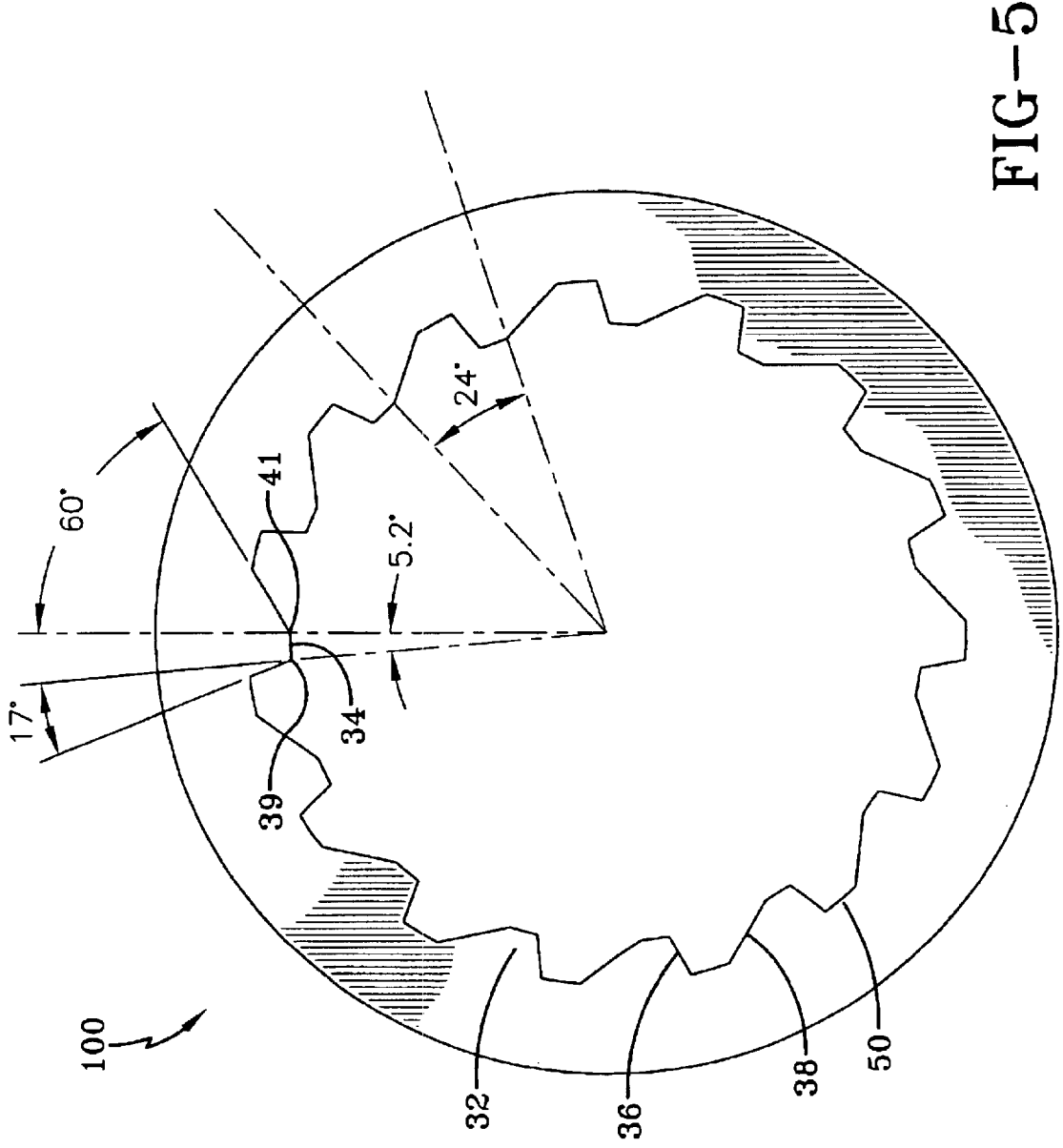

US 6,698,315 B1

HIGH TORQUE WRENCHING SYSTEM

BACKGROUND OF THE INVENTION

1. Field of the Invention

The invention relates generally to a wrench and fastener arrangement and more particularly to a wrench and fastener arrangement with driving surfaces that generate a higher torque in the loosening direction than in the tightening direction.

2. Description of the Prior Art

Wrenches and fasteners have been known in the art for some time. Current wrenches and the mating surfaces of fasteners have been designed symmetrically and have the property of transmitting torque equally in both the tightening and loosening directions. Typical socket wrench types of this kind are shown in FIGS. 1–3. FIG. 1 shows a 1½" Hex socket, FIG. 2 shows a 1" 12 point socket, and FIG. 3 shows a 1" 12 point spline. However, the torque required for loosening a fastener that has been tightened is several times more than the torque required for tightening a fastener. This is because metal surfaces in contact with one another for an extended period of time tend to seize and resist separation. Another factor that causes the fastener to resist separation is the dissolution of the lubricant that may have been present at the time of tightening. Additionally, tightening of a fastener to near its ultimate strength will cause permanent deformation. This permanent deformation causes the pitch of the threads on the fastener to no longer precisely match the pitch of the nut or the tapped hole. The mismatch requires additional torque to force the threaded elements to conform sufficiently to allow rotation of the fastener. Additionally, fastener heads are typically forged. High strength fasteners are typically made from material that is difficult to forge. This material tends not to fill out the outer corners of the fastener, or the inner corners of wrenches.

SUMMARY OF THE INVENTION

In accordance with a preferred embodiment of the present invention, a high torque wrenching system is provided having a wrench with asymmetrical torque. transmission capability. The system further provides a fastener that can mate with the asymmetrical wrench so that the fastener can be axially rotated to a loosened or tightened state. The wrench can be a socket type, an open end type, a closed end type wrench or an internal wrench type. The wrench includes a plurality of protuberances and a plurality of recesses around a central axis. The protuberances and recesses form a saw tooth shape. Each tooth or protuberance is formed by a first wrenching surface for loosening a fastener and a second wrenching surface for tightening a fastener. The wrenching surface carrying the loosening load will be at a much smaller angle, with respect to a radial vector extending from the wrench's central axis, than the wrenching surface carrying the tightening load. The result is that the loosening torque vector will have a much greater moment arm. Further, the mating relationship will be less sensitive to dimensional variations of the fastener and wrench, because a better distribution of load can be accomplished on the loosening surface than on the tightening surface, even though the tightening surface is much larger. The load transmission increases proportionally to the number of protuberances or teeth. Therefore, the number of teeth can vary depending on the application or particular torque requirements. Additionally, more teeth will allow the use of a smaller head diameter for a given fastener's size because the difference between the major and minor diameters is less.

The invention also provides a fastener that is easier to forge because the outer connecting surface of the protuberances is smaller in cross-sectional area than the inner connecting surface of the recesses. This tends to squeeze the metal to the corners during forging. Additionally, the greater slope on the loosening surface than on the tightening surface tends to move the metal toward the tightening surface, filling the right-hand corner of the outer connecting surface of the fastener and the left-hand corner of the outer connecting surface of the wrench. These are on the portions of the wrench that carry the loosening load, which is the greater load. Therefore, it is desirable to have only a small radius in the corner to make the load carrying surface as large as possible.

An example of a mating fastener type could be a typical hexagonal head with a cross flats dimension of approximately one and a half times the bolt diameter. For the same bolt diameter, a 12-point fastener version with a cross flats of one times the diameter could be provided. Standard 12-point fasteners depending on the details of their construction, including head height and material hardness, may not have sufficient wrenchability to fully utilize the properties of the fastener. Using asymmetrical surfaces increases the torque capability while still preserving the small 12-point heads. Additionally, 15-point variations could increase torque requirements while allowing smaller heads. The wrenching surfaces may be straight or have some curvature or tilt. In particular, it could be beneficial for the tightening surface to have some curvature or tilt to help control and improve the contact pattern despite variations in fastener and wrench dimensions.

The fastener also includes a plurality of protuberances and a plurality of recesses. The protuberances of the wrench mate with the recesses of the fastener, and the protuberances of the fastener mate with the recesses of the wrench. This arrangement is beneficial because it precludes the use of common wrench and fastener types outside this system, which could result in the risk of injury because of failure of lesser strength tool types. The fastener and wrench could be comprised of a special material and hardness, such as a pressed-on ring, to further increase its ability to transmit a higher torque than a standard socket.

An object of the present invention is to provide a high torque wrenching system.

Another object of the invention is to provide a wrenching system that transmits more torque when loosening a fastener than when tightening a fastener.

Another object of the present invention is to provide a high torque wrenching system that can be used on heads having larger and smaller diameters.

A further object of the present invention is to provide a wrenching system that transmits higher torque with minimum sized fasteners and wrenches.

Another object of the invention is to provide a high torque wrenching system that cannot mate with members outside the system having lesser strength tools that may result in the risk of injury.

Another object is to provide high strength fasteners that are easier to forge than conventional high strength fasteners.

These and other objects will become apparent from the following description of a preferred embodiment taken together with the accompanying drawings and the appended claims.

BRIEF DESCRIPTION OF THE DRAWINGS

The invention may take physical form in certain parts a and arrangement of parts, referred embodiment of which will be described in detail in the specification and illustrated in the accompanying drawings which form a part hereof, and wherein:

FIG. 4 is an enlarged view of a wrench and fastener represented in outline form.

FIG. 5 is a front view of the preferred embodiment as a 15-point wrench socket type.

DETAILED DESCRIPTION OF PREFERRED EMBODIMENT

Figure 3:
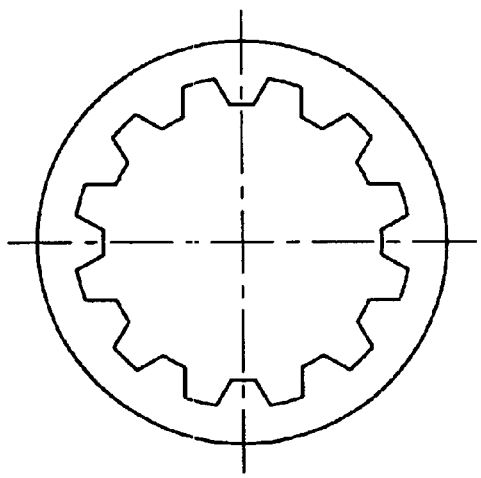
FIG. 3 is a front view of a 1" 12-point wrench socket spline type according to the prior art.
Figure 2:
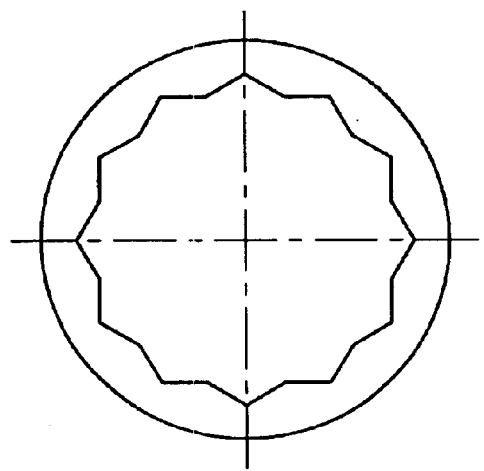
FIG. 2 is a front view of a 1" 12-point wrench socket type according to the prior art.
Figure 1:
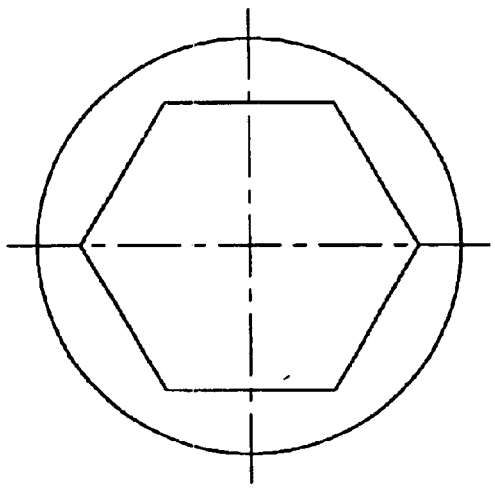
FIG. 1 is a front view of a 1½" Hex wrench socket type according to the prior art.

Referring now to the drawing wherein the showings are for the purpose of illustrating the preferred embodiment of the invention only, and not for purpose of limiting same, FIG. 4 shows the invention in a modification of one of its preferred forms. FIG. 4 shows a high torque system 10 comprised of an asymmetrical wrench 20 and a mating asymmetrical fastener 30 presented in an outline type form which could be an open or closed end wrench type. Standard wrenches and fasteners have a minimum and maximum cross flats dimension established by industry standards. These minimum and maximum dimensions require a maximum and minimum material. Wrench 20 has a maximum material 60 and a minimum required material 62. Fastener 30 has a maximum material 64 and a minimum material 66. The wrench and fastener must be within the minimum and maximum tolerances to be categorized within a specified head size.

Figure 6:
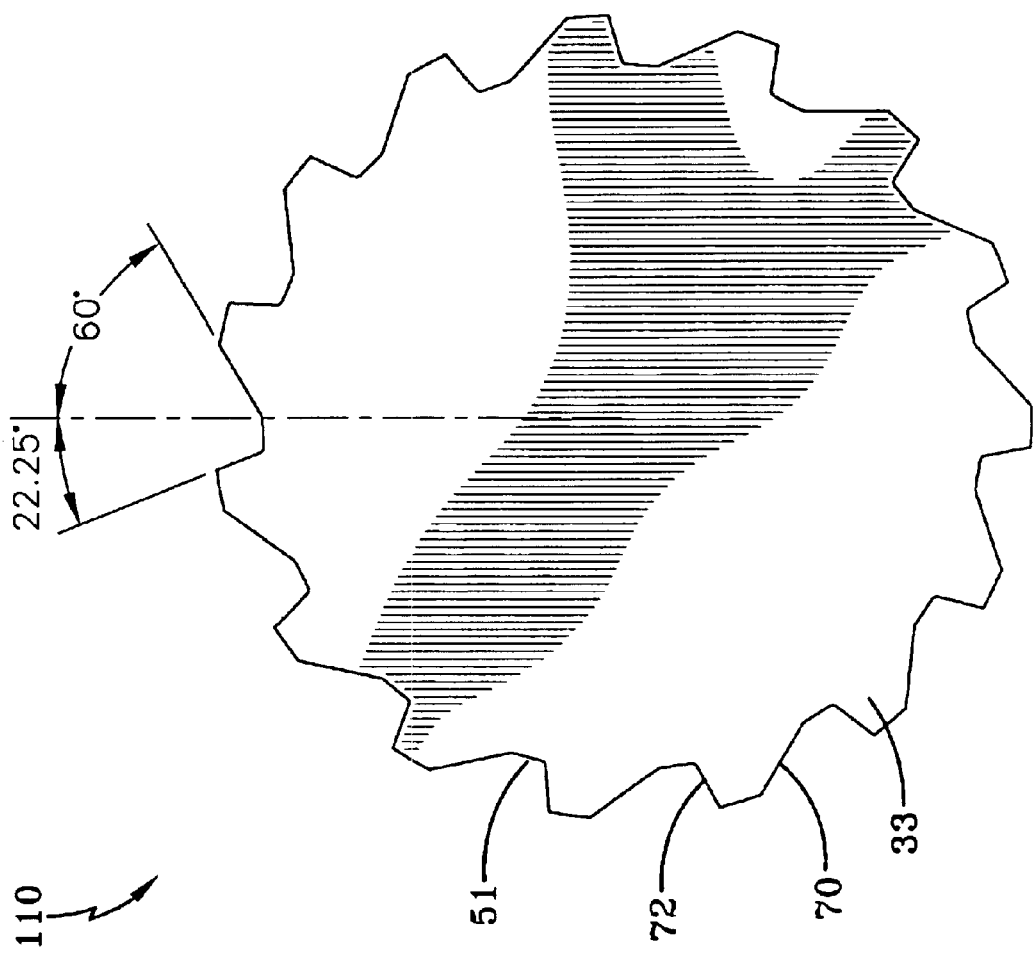
FIG. 6 is a front view of the preferred embodiment as a 15-point fastener mate for the wrench socket type shown in FIG. 5.
Figure 7:
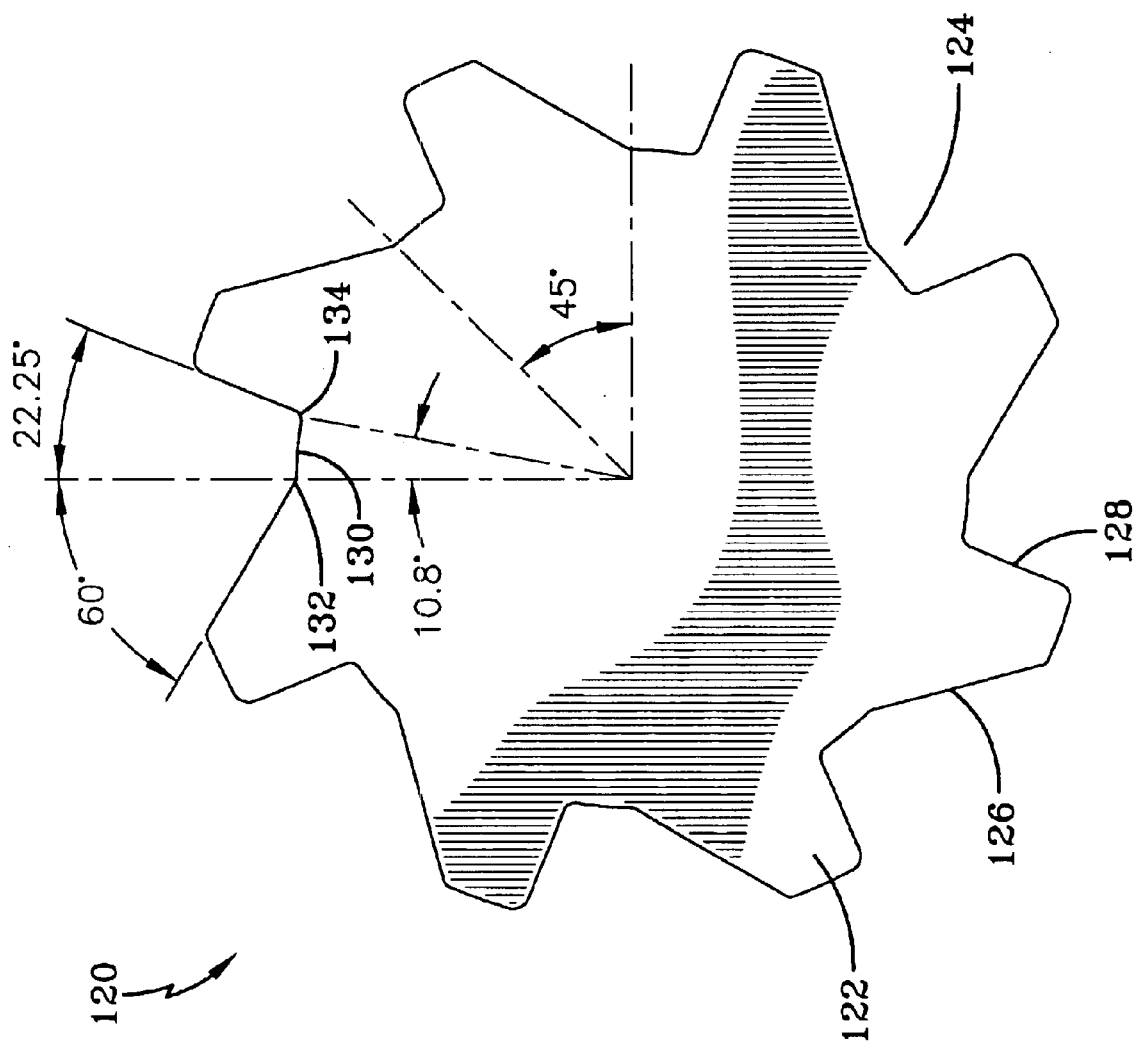
FIG. 7 is a front view of the preferred embodiment as a 8-point internal wrench type.
Figure 8:
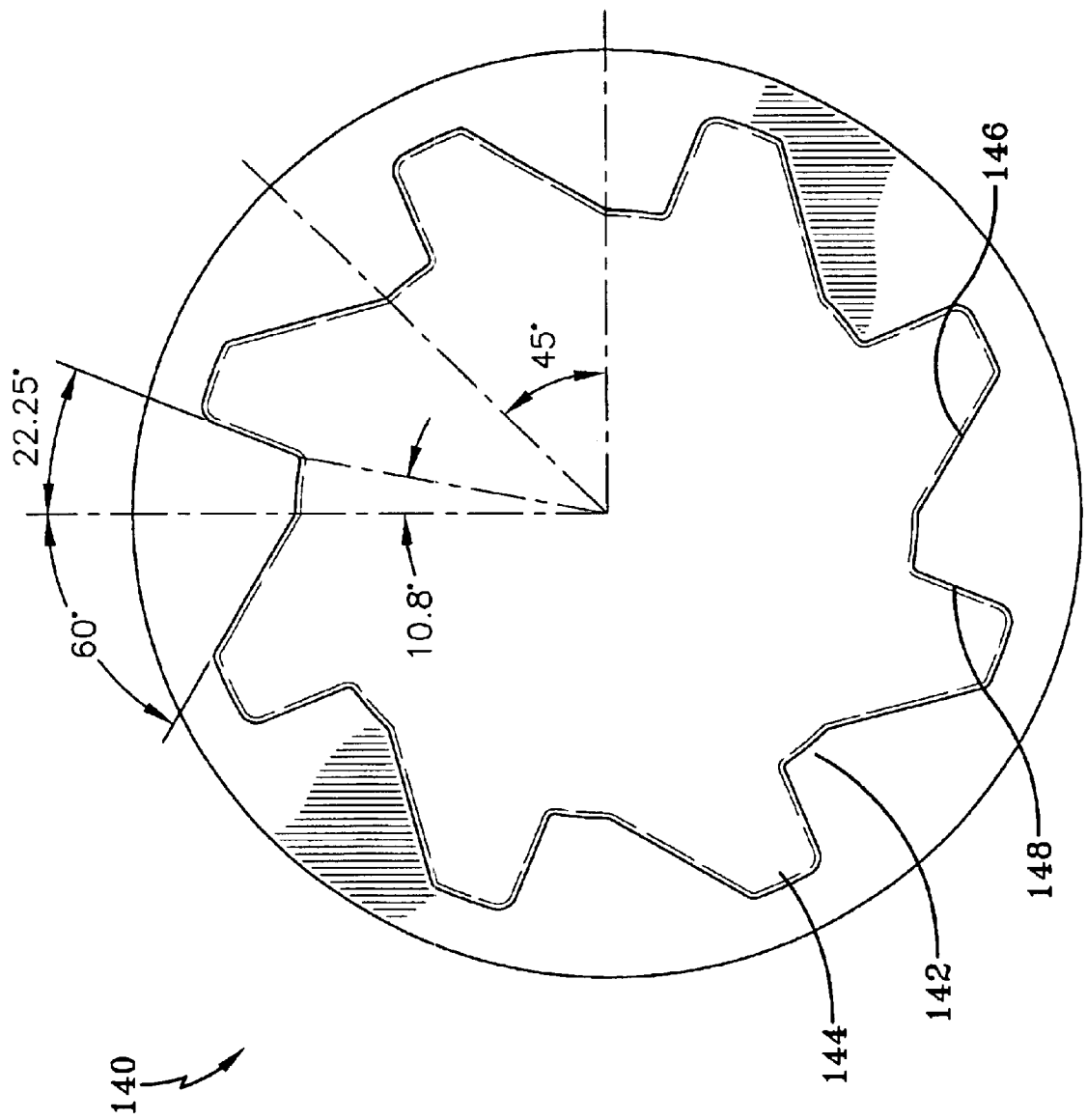
FIG. 8 is a front view of the preferred embodiment as a 8-point internal fastener mate for the internal wrench type shown in FIG. 7.

FIGS. 4–8 show end views of preferred embodiments of fasteners and wrenches according to the invention. Two types of fasteners are shown in these figures, an internal fastener for use in an internal wrenching system, and an external fastener for use in an external wrenching system. As shown in FIG. 8, an internal fastener has one inner perimeter or periphery in which the loosening surfaces, tightening surfaces, protuberances and recesses are formed. As shown in FIGS. 4 and 6, an external fastener has one outer perimeter or periphery in which the loosening surfaces, tightening surfaces, protuberances and recesses are formed. Therefore, each of the preferred embodiments has loosening surfaces, tightening surfaces, protuberances and recesses formed in one perimeter or periphery. This one perimeter or periphery is referred to herein as the single fastener periphery.

Two types of wrenches are shown in these figures, an internal wrench for use in an internal wrenching system, and an external wrench for use in an external wrenching system. As shown in FIG. 7, an internal wrench has one outer perimeter or periphery in which the loosening surfaces, tightening surfaces, protuberances and recesses are formed. As shown in FIGS. 4 and 5, an external wrench has one inner perimeter or periphery in which the loosening surfaces, tightening surfaces, protuberances and recesses are formed. Therefore, each of the preferred wrench embodiments has loosening surfaces, tightening surfaces, protuberances and recesses formed in one perimeter or periphery. This one perimeter or periphery is referred to herein as the single wrench periphery.

Wrench 20 is a 15-point wrench comprised of a plurality of uniformly spaced peripherally and radially disposed protuberances 32 and a plurality of uniformly spaced peripherally and radially disposed recesses 50. Each protuberance 32 is located equidistant from a central axis A and each recess 50 is located equidistant from the central axis A. Fastener 30 is a 15-point fastener and is also composed of a plurality of uniformly spaced peripherally and radially disposed protuberances 33 and a plurality of uniformly spaced peripherally and radially disposed recesses 51, having the same shape as the protuberances and recesses of the wrench. Each protuberance of the fastener is located equidistant from the central axis A and each recess of the fastener is located equidistant from the central axis A. The protuberances of the wrench mates with the recess of the fastener and the protuberances of the fastener mates with the recesses of the wrench. The protuberances are slightly smaller than the recesses to make mating possible.

The protuberances are essentially identical for both the wrench and the fastener and only one of the protuberances of the wrench needs to be described in detail, since all of the wrench protuberances are identical. It should be understood that the protuberances of the wrench extend inwardly, while the protuberances of the fastener extend outwardly, so that the surfaces described for the wrench will be diametrically opposed to the surfaces of the fastener. Protuberance 32 has an inner generally circumferential joining surface 34 that connects a loosening wrenching surface 36 and a tightening wrenching surface 38. Loosening wrenching surface 36 and tightening wrenching surface 38 interface with a loosening engagement surface 72 and a tightening engagement surface 70, respectively, on fastener 30. Loosening engagement surface 72 is connected to tightening engagement surface 70 by an outer fastener engagement surface 74. Inner joining surface 34 of wrench 20 extends equidistantly between a given radius from a first point 39 at loosening wrenching surface 36 to a second point 41 at tightening wrenching surface 38. The ends of inner joining surface 34 converge with the wrenching surfaces 36 and 38, and are joined together by a pair of arches 40 and 42. Loosening wrenching surface 36 forms a 15° angle with respect to radius R. Tightening wrenching surface 38 forms a 60° angle with respect to radius R'. The result is that the torque vector of the loosening surface is much larger than the torque vector of the tightening surface, even though the length of the loosening surface is much longer.

As shown in FIGS. 4–8 the respective angle of either a loosening surface or tightening surface according to the invention is measured from a radial vector extending from the center of a respective fastener or wrench and through a joining surface (for example, surface 34 in FIGS. 4 and 5). Further, as shown in FIG. 4, the respective angles of the loosening surface and fastening surface are preferably measured from different radial vectors extending through a joining surface, such as joining surface 34. As shown in FIG. 4, the radial vector from which the angle of the loosening surface is measured is preferably closer to the loosening surface than is the radial vector from which the angle of the tightening surface is measured. Furthermore, the radial vector from which the angle of the tightening surface angle is measured is preferably closer to the tightening surface than is the radial vector from which the angle of the loosening surface is measured. However, unless otherwise stated in the claims, the invention encompasses a system including a tightening surface formed at a greater angle than the angle of the loosening surface as measured from any radial vector extending through a joining surface formed between the two.

Tightening wrenching surface 38 forms a 60° angle with respect to radius R'. The result is that the torque vector of the loosening surface is much larger than the torque vector of the tightening surface, even though the length of the loosening surface is much longer.

As shown in FIGS. 4–8 the respective angle of either a loosening surface or tightening surface according to the invention is measured from a radial vector extending from the center of a respective fastener or wrench and through a joining surface (for example, surface 34 in FIGS. 4 and 5). Further, as shown in FIG. 4, the respective angles of the loosening surface and fastening surface are preferably measured from different radial vectors extending through a joining surface, such as joining surface 34. As shown in FIG. 4, the radial vector from which the angle of the loosening surface is measured is preferably closer to the loosening surface than is the radial vector from which the angle of the tightening surface is measured. Furthermore, the radial vector from which the angle of the tightening surface angle is measured is preferably closer to the tightening surface than is the radial vector from which the angle of the loosening surface is measured. However, unless otherwise stated in the claims, the invention encompasses a system including a tightening surface formed at a greater angle than the angle of the loosening surface as measured from any radial vector extending through a joining surface formed between the relevant tightening surface and loosening surface.

The recesses are essentially identical for both the wrench and the fastener and only one of the recesses of the wrench will be described in detail. It should be understood that the recesses 50 of the wrench extend outwardly, while the recesses 51 of the fastener extend inwardly so that the surfaces described for the wrench will be diametrically opposed, with respect to the fastener. Recess 50 has an outer circumferential joining surface 52 that connects tightening wrenching surface 38, which is part of protuberance 32, with a second loosening wrenching surface 36 of an adjoining protuberance. Outer circumferential joining surface 52 extends equidistantly along a given circumference from a first point 55 where its projection intersects a projection of the tightening surface 38, to a second point 57, where it is at the intersection of projected second loosening surface 36. That is, point 55 is at the intersection of projected surfaces 52 and 38, and point 57 is at the intersection of projected surfaces 52 and 36. Loosening wrenching surface 36 forms a 15° angle with respect to radius R. Tightening wrenching surface 38 forms a 60° angle with respect to radius R' as previously discussed.

As can be seen in FIG. 4, protuberance 32 and adjoining recess 50 form a complete section for mating with a point on a fastener. These sections are repeated radially and equal the number of points of the mating fastener forming a saw tooth type shape. In this embodiment, there are 15 points but the invention could have 8, 12 or a different number of points depending on the application, head size and torque requirements. It should also be understood, that the invention is not limited to a loosening surface having an angle 15° away from a radii extending from the central axis of the wrench or fastener, and is not limited to a tightening surface having an angle of 60° away from a radii extending from the central axis of the wrench or fastener. It should be understood that different angles could be chosen according to desired head size, number of points and torque requirements. In all cases the loosening surface would require a smaller angle than the tightening surface.

For example, FIG. 5 shows a socket type wrench 100 having 15 points and a mating fastener head 110 shown in FIG. 6. Referring now to socket type wrench 100, where like numerals denote like parts, socket head 100 is comprised of a plurality of protuberances 32 and recesses 50, as described previously, having tightening wrenching surfaces 36 and loosening wrenching surfaces 38. The tightening wrenching surfaces 36 have an angle of 60° away from a radii extending from a central axis, like the previously described embodiment; however the loosening surfaces 38 are at an angle of about 17° with radii extending from the central axis as shown. Each protuberance 32 is spaced apart at 24° angles from each adjoining protuberance. In this particular embodiment, inner joining surface 34 extends circumferentially from points 39 to 41 over an angle of 5.2°.

Referring now to the fastener 110, where like numerals denote like parts, socket fastener 110 is comprised of a plurality of protuberances 33 and recesses 51, as described previously, having tightening engagement surfaces 70 and loosening engagement surfaces 72. The tightening engagement surfaces 70 have an angle of 60° away from a radii extending from a central axis, and loosening surfaces 72 are at a 22.25° angle with a radii extending from the central axis, as described in mating wrench 100.

It should be appreciated that the number of points or teeth of the wrench and number of points on the fasteners can vary depending on the shape, size, hardness of the fastener, and the application being facilitated. Smaller heads can be used as the number of points increase because more teeth will allow for a smaller diameter head. However, smaller teeth require more precise manufacturing. Increasing the number of teeth can increase the amount of torque because the load transmission increases with the number of teeth.

The tightening and/or loosening surfaces can be curved as well as planar. The curved tightening loosening surfaces are still formed at angles with respect to a radial vector and perform the functions described herein.

It should also be appreciated that the system described above is a preferred embodiment for increasing torque transmission capability. Although providing a wrench and fastener with a higher torque transmission capability in the loosening direction than in the tightening direction almost inevitably requires an asymmetrical shape, but increasing torque capability may not. A standard design of a 12-point or higher fastener, depending on the details of its construction, including head height and material hardness, may not have sufficient wrenchability to fully utilize the properties of the fastener. However, using a larger cross flats dimension on a 12-point fastener would increase the torque transmission capability and improve the systems overall wrenchability, making it possible to fully utilize the properties of the fastener. For example, if the 12-point fastener is made with a cross flats of 1.3 or 1.5 times the bolt diameter, its wrenchability problems wold be solved and designs originally made with hexagonal headed fasteners could be upgraded and standard wrenches used. The current invention provides a way around this problem while still preserving the smaller fastener heads.

It should also be appreciated that this high torque wrenching system could be applied to internal wrenching systems such as that found in hollow head cap screws such as "Allen" fasteners. This could be possible by interchanging the wrench and the fastener so that the wrench element is inside the hollow head of the fastener. In this configuration, the number of points on the fastener and wrench are likely to be smaller to facilitate manufacturing, because the wrenching surfaces are toward the center of the fastener rather than on the outside, and because there is no need in this design to consider a nut. A nut cannot be made with an internal wrenching configuration, whereas a nut must be considered in the design of an external wrenching configuration, and space must be left for the tapped hole in the nut. In the internal wrenching configuration larger teeth can be used that will not be limited by the internal space.

Referring to FIG. 7, which shows an internal wrench 120 used for mating a hollow head cap screw 140 shown in FIG. 8. Internal wrench 120 and mating hollow head cap screw 140 each have 8 points. Internal wrench 120, is comprised of a plurality of outwardly directed protuberances 122 and inwardly directed recesses 124, each having a tightening wrenching surface 126 and a loosening wrenching surface 128. Tightening wrenching surfaces 126 have an angle of 60° away from a radii extending from a central axis, and the loosening wrenching surfaces 128 are at a 22.25° angle with a radii extending from the central axis, like the previously described embodiment. Each protuberance 122 is spaced apart at 45° angles from each adjoining protuberance. In this particular embodiment, inner joining surface 130 extends circumferentially from points 132 to 134 over an angle of 10.8°.

Referring now to mating hollow head cap 140, shown in FIG. 8, is comprised of a plurality of inwardly directed protuberances 142 and outwardly directed recesses 144, as described previously, having tightening engagement surfaces 146 and loosening engagement surfaces 148. The tightening engagement surfaces 146 have an angle of 60° away from a radii extending from a central axis, and loosening engagement surfaces 148 are at a 22.25° angle with a radii extending from the central axis, as described in mating wrench 120.

The foregoing descriptions are specific embodiments of the present invention. It should be appreciated that these embodiments are described for the purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. An asymmetrical wrenching system for tightening and loosening a fastener, wherein the system can generate a greater torque to failure in the loosening direction than in the tightening direction, the system comprising:
    (a) an asymmetrical fastener, the fastener being tightened when turned in one direction and being loosened when turned in the opposite direction, the fastener having a center, a single fastener periphery, and at least one fastener loosening surface formed in the single fastener periphery, at least one fastener tightening surface formed in the single fastener periphery, and at least one fastener joining surface formed in the single fastener periphery; wherein:
        (i) the at least one fastener joining surface is formed between the at least one fastener loosening surface and the at least one fastener tightening surface;
        (ii) the at least one fastener loosening surface forms an angle with a first radial vector extending from the center of the fastener and through the at least one fastener joining surface; and
        (iii) the at least one fastener tightening surface forms an angle with the first radial vector extending from the center of the fastener and through the at least one fastener joining surface, the angle formed between the first radial vector and the at least one fastener tightening surface being greater than the angle formed between the first radial vector and the at least one fastener loosening surface; and
    (b) an asymmetrical wrench for loosening and tightening the asymmetrical fastener, the wrench having a center, a single wrench periphery, and at least one wrench loosening surface formed in the single wrench periphery, at least one wrench tightening surface formed in the single wrench periphery, and at least one wrench joining surface formed in the single wrench periphery; wherein:
        (i) the at least one wrench joining surface is formed between the at least one wrench loosening surface and the at least one wrench tightening surface;
        (ii) the at least one wrench loosening surface forms an angle with a second radial vector extending from the center of the wrench and through the at least one wrench joining surface; and
        (iii) the at least one wrench tightening surface forms an angle with the second radial vector extending from the center of the wrench and through the at least one wrench joining surface, the angle formed between the second radial vector and the at least one wrench tightening surface being greater than the angle formed between the second radial vector and the at least one wrench loosening surface;
    whereby the single wrench periphery engages the single fastener periphery such that the at least one wrench loosening surface is juxtaposed the at least one fastener loosening surface and the at least one wrench tightening surface is juxtaposed the at least one fastener tightening surface, and when force is applied to move the wrench in the tightening direction, the at least one wrench tightening surface engages the at least one fastener tightening surface to tighten the fastener, and when force is applied to move the wrench in the loosening direction, the at least one wrench loosening surface engages the at least one fastener loosening surface to loosen the fastener.

2. The asymmetrical wrenching system of claim 1 wherein:
    (a) the asymmetrical fastener includes a fastener recess being defined by (i) one of the at least one fastener joining surfaces, (ii) one of the at least one fastener loosening surfaces, and (iii) one of the at least one fastener tightening surfaces; and
    (b) the asymmetrical wrench includes a wrench protuberance defined by (i) one of the at least one wrench joining surfaces, (ii) one of the at least one wrench loosening surfaces, and (iii) one of the at least one wrench tightening surfaces; whereby the wrench protuberance is received in the fastener recess when the single wrench periphery engages the single fastener periphery.

3. The system of claim 2 wherein:
    (a) the asymmetrical fastener includes a plurality of fastener recesses and a plurality of fastener protuberances, the fastener recesses and fastener protuberances alternating such that each fastener protuberance has a fastener recess on either side thereof, each fastener protuberance being defined by (i) one of the at least one fastener loosening surfaces on one side of the fastener protuberance, (ii) one of the at least one fastener tightening surfaces on the opposite side of the fastener protuberance, and (iii) one of the at least one fastener joining surfaces; and (b) the asymmetrical wrench includes a plurality of wrench recesses and a plurality of wrench protuberances, the wrench recesses and wrench protuberances alternating such that each wrench recess has a wrench protuberance on either side thereof, each wrench recess being defined by (i) one of the at least one wrench loosening surfaces on one side of the wrench recess, (ii) one of the at least one wrench tightening surfaces on the opposite side of the wrench recess, and (iii) one of the at least one wrench joining surfaces.

4. The system of claim 1 wherein the fastener has a plurality of fastener loosening surfaces and an equal number of fastener tightening surfaces.

5. The system of claim 4 wherein the wrench has the same number of wrench loosening surfaces as there are fastener loosening surfaces.

6. The system of claim 4 wherein the wrench has the same number of wrench tightening surfaces as there are fastener tightening surfaces.

7. The system of claim, 1 wherein the at least one fastener loosening surface is formed at a 15° angle and the at least one fastener tightening surface is formed at a 60° angle.

8. The system of claim 1 wherein the at least one wrench loosening surface is formed at a 15° angle and the at least one wrench tightening surface is formed at a 60° angle.

9. The system of claim 1 wherein the at east one fastener loosening surface is formed at a 22.25° angle and the at least one fastener tightening surface is formed at a 60° angle.

10. The system of claim 1 wherein the at least one wrench loosening surface is formed at a 22.25° angle and the at least one wrench tightening surface is formed at a 60° angle.

11. The system of claim 4 wherein the number of fastener loosening surfaces are selected from the group consisting of 8, 12, 15 and 18.

12. The system of claim 1 wherein the number of wrench loosening surfaces are selected from the group consisting of 8, 12, 15 and 18.

13. The system of claim 11 wherein the wrench type is selected from the group consisting of socket, open end, internal and closed end.

14. An asymmetrical wrench for loosening and tightening an asymmetrical fastener, the fastener being tightened when turned in one direction and being loosened when turned in the opposite direction wherein:

(a) the asymmetrical wrench has a center, and a single wrench periphery, and at least one wrench loosening surface formed in the single wrench periphery, at least one wrench tightening surface formed in the single wrench periphery, and at least one wrench joining surface formed in the single wrench periphery, wherein:
 (i) the at least one wrench loosening surface forms a first angle with a radial vector extending from the center of the wrench and through the at least one wrench joining surface; and
 (ii) the at least one wrench tightening surface forms a second angle with the radial vector, wherein the second angle is greater than the first angle.

15. The wrench of claim 14 wherein the wrench includes a wrench protuberance being defined by (i) one of the at least one wrench joining surfaces, (ii) one of the at least one wrench loosening surfaces, and (iii) one of the at least one wrench tightening surfaces.

16. The wrench of claim 15 wherein the wrench includes a plurality of wrench recesses and a plurality of wrench protuberances, the wrench recesses and wrench protuberances alternating such that each wrench recess has a wrench protuberance on either side, each wrench recess being defined by (i) one of the at least one wrench loosening surfaces of the protuberance on one side of the wrench recess, (ii) one of the at least one wrench tightening surfaces of the protuberance on the opposite side of the wrench recess, and (iii) a second wrench joining surface.

17. The wrench of claim 14 wherein the wrench has a plurality of wrench loosening surfaces and an equal number of wrench tightening surfaces.

18. The wrench of claim 14 wherein the first angle is a 15° angle and the second angle is a 60° angle.

19. The wrench of claim 14 wherein the first angle is a 22.25° angle and the second angle is a 60° angle.

20. The wrench of claim 14 wherein the number of wrench loosening surfaces are selected from the group consisting of 8, 12, 15 and 18.

21. The wrench of claim 14 wherein the wrench type is selected from the group consisting of socket, open end, internal and closed end.

\* \* \* \* \*